Dec. 20, 1932.  O. L. HERRON  1,891,765
WINDSHIELD
Filed Sept. 12, 1931
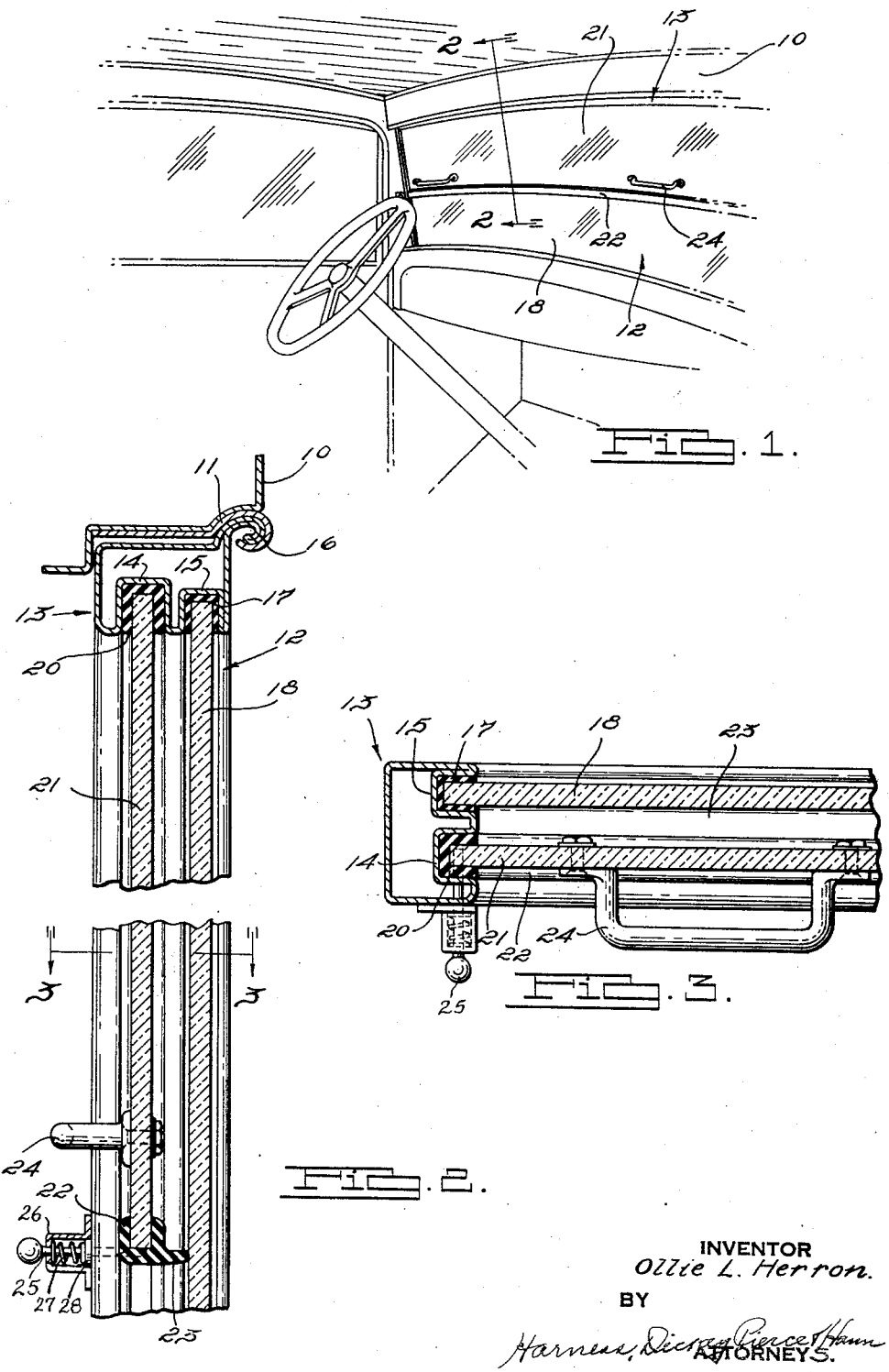
INVENTOR
Ollie L. Herron.
BY
ATTORNEYS Patented Dec. 20, 1932

1,891,765

UNITED STATES PATENT OFFICE

OLLIE L. HERRON, OF CHICAGO, ILLINOIS, ASSIGNOR OF THIRTY PER CENT TO ANNA L. HERRON, TWENTY PER CENT TO JOSEPH B. ZIMMERS, AND THIRTY PER CENT TO WILMA M. ZIMMERS, ALL OF CHICAGO, ILLINOIS

WINDSHIELD

Application filed September 12, 1931. Serial No. 562,494.

The invention relates to windshields and it has particular relation to transparent shields for motor vehicles or the like.

It is general practice to provide transparent windshields, such as those constructed of glass, in motor vehicles or the like, for protecting occupants of the vehicle against wind, rain and other natural elements. In a closed car, one of the disadvantages of a windshield of this character, in wintry or cold weather, is that the outer or front side of the glass is subjected to a very low temperature as compared to that temperature to which the inner side of the glass is subjected, and this difference in temperature causes condensation of moisture on the inner surface of the glass and even formation of frost if the temperature in the car is not sufficiently high.

The principal objects of this invention are to provide an improved windshield which will largely if not entirely prevent condensation of moisture and frosting on the inner side of the glass; and to provide an improved windshield of the dual glass type, wherein a space is provided between the two pieces of glass which is sealed for the purpose of preventing low temperatures at the inner surface of the inner glass and hence condensation of moisture, and frosting thereon.

For a better understanding of the invention reference may be had to the accompanying drawing, forming a part of the specification wherein—

Fig. 1 is a fragmentary view of the interior of a motor vehicle of the closed car type, illustrating a windshield constructed according to one from of the invention;

Fig. 2 is a cross sectional view, on a larger scale taken substantially along line 2—2 of Fig. 1;

Fig. 3 is a fragmentary cross sectional view, taken substantially along line 3—3 of Fig. 2.

Referring to Figs. 1 and 2, a metal frame member 10 extends transversely of the vehicle above the windshield, and in this instance the frame member is provided with a hinge element 11. The windshield, indicated generally at 12, comprises a metal frame 13 of generally rectangular shape which has a pair of spaced, metal channels 14 and 15 formed in the inner peripheral portion thereof. The upper side of the frame 13 is provided with a hinge member 16 cooperating with the hinge member 11 on the vehicle frame member 10. The channel 15 is disposed at the front side of the channel 14, and is provided with a complementary, channel sealing member 17 composed of rubber or other suitable material, which receives the edges of a glass 18.

The sides and upper transverse portion of channel 14 are provided with a similar rubber sealing member 20 and the opposite, vertical side portions thereof constitute a guideway for an auxiliary glass 21 which, as best shown by Fig. 2, and Fig. 1, is only about half as wide in a vertical direction as the glass 18. When the glass 21 is in its uppermost position, its upper edge fits in the channel rubber 20 extending transversely across the top of the frame side. The lower edge of the glass 21 is provided with a channel shaped rubber member 22 which moves with the glass in any vertical movement thereof, and this rubber member has a lip 23 extending toward the glass 18 and resiliently contacting therewith. Opposite, lower portions of the glass 21 are provided with handles 24 for facilitating vertical movement of the glass in the frame.

For positively maintaining the glass 21 in its upper position, a latch is provided which comprises a pin 25 slidably mounted in an opening in the frame as shown by Figs. 2 and 3. The pin outwardly of the frame extends through an offset bracket 26 secured to the frame, and a spring 27 encircling the pin and abutting the bracket at one end and a collar 28 on the pin, inwardly of the bracket at its other end, normally maintains the pin in its operative position for supporting the glass. A latch of this character preferably is used at each side of the shield.

Normally, the glass 21 will be disposed in its upper position in cold or wintry weather, and in its lower position in warmer weather. Hence in wintry weather it will extend transversely of the normal line of vision of those in the vehicle, while in warmer weather, it will be below the normal line of vision. When the glass 21 is in its upper position, the space between the two pieces of glass is sealed and the air therein serves as an insulator against rapid conduction of heat through the auxiliary glass. Hence, the inner surface of the latter will not be subjected to a low temperature which would cause condensation of moisture and frosting.

Although only one form of the invention has been described and illustrated in detail, it will be apparent to those skilled in the art that various modifications may be made without departing from the scope of the appended claims.

I claim:

1. A windshield comprising a frame, a main shield having its entire peripheral edge mounted in the frame, an auxiliary and smaller shield slidably mounted in the frame in spaced relation to the main shield, and means for sealing the space between the shields.

2. A windshield comprising a frame, a main shield having its entire peripheral edge mounted in the frame, an auxiliary shield slidably mounted in two opposed sides of the frame, the latter shield being of less width than the main shield in a direction parallel to such opposed sides of the frame, and means for sealing the space between the shields.

3. A windshield comprising a frame, a main shield having its entire peripheral edge mounted in the frame, a smaller auxiliary shield slidably mounted in the frame in spaced relation to the main shield, and means for sealing the space between the shields when the auxiliary shield is moved into one position.

4. A windshield for a motor vehicle or the like, comprising a frame, a main shield having its entire peripheral edge mounted in the frame, a smaller auxiliary shield mounted for sliding movement in the frame in spaced relation to the main shield, and means for sealing the space between the shields when the auxiliary shield is moved transversely of the normal line of vision of occupants of the car.

5. A windshield comprising a frame, a main shield having its entire peripheral edge mounted and sealed in the frame, an auxiliary shield extending between and slidably mounted in vertical sides of the frame, said auxiliary shield being of less vertical width than the main shield, means for sealing the upper and side edges of the auxiliary shield when in its uppermost position, and resilient means between the lower portion of the auxiliary shield and the main shield for sealing the space between the shields.

6. A windshield comprising a frame, a main shield having its entire peripheral edge mounted in the frame, an auxiliary shield slidably mounted in the frame in spaced relation to the main shield, latch means for retaining the auxiliary shield in a raised position, and means for sealing the space between the shields when the auxiliary shield is in its raised position.

7. In combination, a vehicle having a windshield frame, a main shield completely filling the frame and mounted therein, an auxiliary and smaller shield slidably mounted in opposed sides of the frame, and means for sealing the space between the shields when the auxiliary shield is moved transversely of the line of vision of an operator of the vehicle.

8. In combination, a vehicle having a windshield frame, a main shield completely filling the frame and mounted therein, an auxiliary and smaller shield mounted in opposed and vertical sides of the frame for slidable movement therein, so that the auxiliary shield may be moved into its upper position and across the line of normal vision of an operator of the vehicle, and means for sealing the space between the shields when the auxiliary shield is moved into such upper position.

OLLIE L. HERRON.